(12) United States Patent
Culler

(10) Patent No.: US 12,140,059 B2
(45) Date of Patent: Nov. 12, 2024

(54) DEVICE TO CORRECT STACK EMISSIONS BASED ON HUMIDITY MEASUREMENTS

(71) Applicant: Honeywell International Inc., Morris Plains, NJ (US)

(72) Inventor: Wyatt Culler, Berne, IN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/133,698

(22) Filed: Apr. 12, 2023

(65) Prior Publication Data
US 2024/0344476 A1    Oct. 17, 2024

(51) Int. Cl.
*F01N 11/00*    (2006.01)
*F01N 13/00*    (2010.01)

(52) U.S. Cl.
CPC ............ *F01N 11/00* (2013.01); *F01N 13/008* (2013.01); *F01N 2560/025* (2013.01); *F01N 2560/028* (2013.01); *F01N 2900/1402* (2013.01); *F01N 2900/1628* (2013.01)

(58) Field of Classification Search
CPC .. F01N 11/00; F01N 13/008; F01N 2560/025; F01N 2560/028; F01N 2900/1402; F01N 2900/1628
See application file for complete search history.

(56) References Cited

U.S. PATENT DOCUMENTS

| | | |
|---|---|---|
| 4,059,385 A | 11/1977 | Gulitz et al. |
| 2004/0003723 A1* | 1/2004 | Ueno ................ B01D 53/0454 96/111 |
| 2010/0307238 A1 | 12/2010 | Van Popta et al. |
| 2017/0074138 A1* | 3/2017 | Srinivasan .......... F02D 41/1401 |
| 2020/0122081 A1* | 4/2020 | Okamura ................. F01N 3/00 |
| 2020/0141653 A1 | 5/2020 | Kucera et al. |
| 2021/0163821 A1 | 6/2021 | Quanci et al. |

(Continued)

FOREIGN PATENT DOCUMENTS

| | | |
|---|---|---|
| WO | 90/10222 A1 | 9/1990 |
| WO | 2008/106056 A1 | 9/2008 |

OTHER PUBLICATIONS

Wyatt Culler, "Using Chamber Humidity Measurements to Correct Pollutant Concentrations," Apr. 25, 2022.

(Continued)

*Primary Examiner* — Brandon D Lee
(74) *Attorney, Agent, or Firm* — Ortiz & Lopez, PLLC; Luis M. Ortiz; Kermit D. Lopez

(57) ABSTRACT

A device and method for correcting emissions can include a first sensor that measures a sample of air not containing an exhaust gas, and a second sensor, wherein the exhaust gas enters a settling chamber and a relative humidity of the exhaust gas is measured by the second sensor. A microcomputer can calculate a mass of water vapor in the sample of air measured by the first sensor and in the exhaust gas measured by the second sensor and can determine a dilution factor of the measured exhaust gas. The dilution factor can be used for correcting emissions based on the measurements of the exhaust gas made by the first sensor and the second sensor. The first and second sensors can comprise one or more of, for example, a relative humidity sensor, a dew point sensor, a trace water vapor sensor and/or other types of sensors.

17 Claims, 4 Drawing Sheets

(56) References Cited

U.S. PATENT DOCUMENTS

2021/0262663 A1   8/2021   Culler
2022/0221846 A1   7/2022   Culler et al.

OTHER PUBLICATIONS

Wyatt Culler, "Using Chamber Humidity Measurements to Correct Pollutant Concentrations in High Dilution Applications," 39th Annual Combustion Symposium, Vancouver, Canada, Jul. 24-29, 2022.

* cited by examiner

Sensor 1 not pictured in drawing

DEVICE TO CORRECT STACK EMISSIONS BASED ON HUMIDITY MEASUREMENTS

TECHNICAL FIELD

The embodiments are generally related to the field of emissions corrections, particularly in high-dilution environments. The embodiments are also related to emissions from burners used in high-dilution environments.

BACKGROUND

A high-dilution air environment refers to a situation where the products of combustion may be a small fraction of the flue gases. This can occur in various industrial settings, such as process heating, where products of combustion can be used to heat a large volume of air. In such cases, the high level of dilution makes it challenging to accurately measure the number of regulated pollutants in the exhaust stream, which are measured on a volumetric basis (most often parts-per-million).

In most applications, the as-measured emissions may be "corrected" to an equivalent emission concentration at a specified stack O2 percent (often 3% or 15%). The correction is a scaling factor that multiplies the as-measured pollutant concentration by the amount of dilution in the stack relative to the reference condition. This correction factor is straightforward to measure and can apply a penalty for using large amounts of dilution air to reduce the as-measured pollutant concentration.

For example, consider a burner which generates 50 ppm of NOx emissions in the exhaust at a reference level of 3% O2 and a NOx regulation limit of 25 ppm corrected to 3% O2. The system operator could mix enough atmospheric air with the burner exhaust gases to create a stack concentration of NOx that is 25 ppm. Without correction, it would appear the system operator is in compliance with the regulatory limit of 25 ppm. However, the dilution correction factor in this case would be 2, which demonstrates that the burner operator is not in compliance with the regulations. As a result, accurately measuring this correction factor is critical for monitoring regulations and developing new low-emissions burners.

A common technique for measuring the dilution factor involves using the ratio of the O2 concentration at the measurement location with the reference concentration. When the measured stack oxygen concentration is significantly lower than the atmospheric oxygen concentration, the correction factor is not sensitive to measurement uncertainty. As the measured stack oxygen concentration approaches the atmospheric oxygen concentration, however, the uncertainty becomes exponentially more sensitive to oxygen concentration measurement uncertainty (e.g., see graphs 10 and 12 in FIG. 1).

These high oxygen environments can occur in direct fire air heat applications. In dilute air streams with carbon-based fuels, the carbon dioxide concentration may be a less sensitive way to correct measured emissions to a reference level. This technique, however, does not work when the flue gas contains only trace amounts CO2, as is the case for high hydrogen or pure hydrogen fuel blends.

A need exists to correct emissions for hydrogen and hydrogen blend burners in high dilution air environments. The number of hydrogen and hydrogen blend combustion systems are expected in increase as countries and companies work towards net zero carbon emissions. This invention describes a method of correcting emissions using measurements of water vapor in the gas stream both pre and post combustion.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide methods, systems and devices for correcting emissions.

It is another aspect of the embodiments to provide methods, systems and devices that use chamber humidity measurements to correct pollutant concentrations.

It is also an aspect of the embodiments to provide for methods, systems, and devices for correcting stack emissions based on humidity measurements in pre- and post-combustion gases.

The aforementioned aspects and other objectives can now be achieved as described herein. In an embodiment, a device for correcting emissions, can include: a first sensor that measures the relative humidity of a sample of air not containing an exhaust gas; a second sensor that measures the relative humidity of the exhaust gas; and a microcomputer that calculates a mass of water vapor in the sample of air measured by the first sensor and in the exhaust gas measured by the second sensor and determines a dilution factor of the measured exhaust gas, the dilution factor used for correcting emissions based on the measurements of the exhaust gas made by the first sensor and the second sensor.

In an embodiment, the exhaust gas can enter a settling chamber where the relative humidity of the exhaust gas can be measured by the second sensor.

In an embodiment, the exhaust gas can be cooled to increase the relative humidity of the exhaust gas prior to measuring the relative humidity of the exhaust gas measured by the second sensor.

In an embodiment, the first sensor can measure the air entering a blower.

An embodiment of the device can include a sampling probe and a sample pump, wherein the sample pump draws a sample of the exhaust gas from a process air stream via the sampling probe.

In an embodiment, the first and second sensors may be, for example, one or more of a relative humidity sensor, a dew point sensor, a trace water vapor sensor, and/or other types of sensors.

In an embodiment, the dilution factor can be determined by the microcomputer using a stoichiometry of the exhaust gas.

In an embodiment, a device for correcting emissions, can include: a plurality of sensors, wherein at least one sensor measures a sample of air not containing an exhaust gas, and at least one other sensor measures a relative humidity of the exhaust gas; and a microcomputer that calculates a mass of water vapor in the sample of air measured by the at least one sensor and in the exhaust gas measured by the at least one other sensor and determines a dilution factor of the measured exhaust gas, the dilution factor used for correcting emissions based on the measurements of the exhaust gas made by the plurality of sensors. The exhaust gas can be cooled to increase the relative humidity of the exhaust gas prior to measuring the relative humidity of the exhaust gas measured by the second sensor.

In an embodiment, a method of operating a device for correcting emissions, can involve: measuring with a first sensor, a sample of air not containing an exhaust gas; measuring a relative humidity of the exhaust gas with the second sensor, wherein the exhaust gas enters a settling chamber and the relative humidity of the exhaust gas is measured by the second sensor; and calculating a mass of water vapor in the sample of air measured by the first sensor and in the exhaust gas measured by the second sensor and determines a dilution factor of the measured exhaust gas, the dilution factor used for correcting emissions based on the measurements of the exhaust gas made by the first sensor and the second sensor.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Like reference symbols or reference numerals in the various drawings indicate like elements.

DETAILED DESCRIPTION

Figure 1:
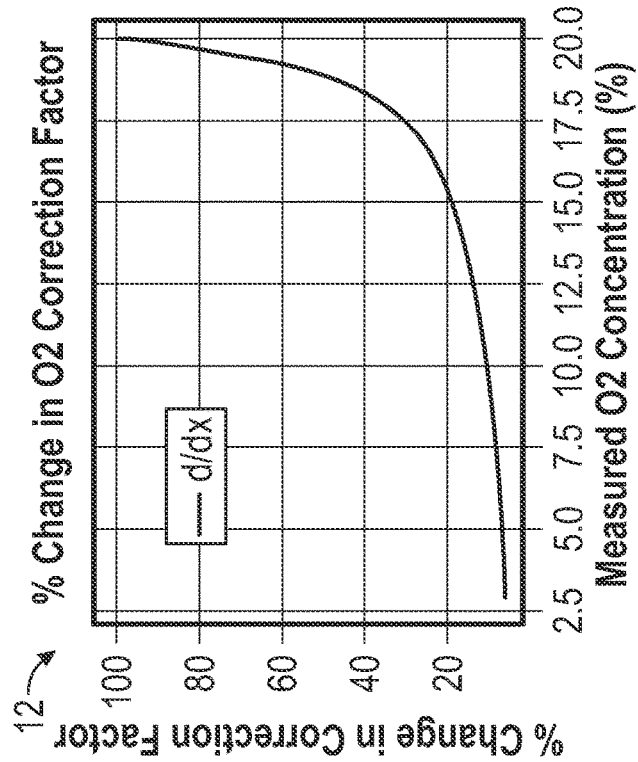
FIG. 1 illustrates a graph depicting the O2 correction factor and the sensitivity of the O2 correction as a function of measured O2 concentration.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment. Similarly, the phrase "in another embodiment" or "in another example embodiment" and variations thereof as utilized herein may or may not necessarily refer to a different embodiment. It is intended, for example, that claimed subject matter may include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. The term "at least one" may refer to "one or more". For example, "at least one widget" may refer to "one or more widgets."

The term "flue" as utilized herein can relate to a duct or a passage that can be used to carry exhaust gases, smoke, or fumes from a combustion process to the outside atmosphere. Flues are typically can be configured from metal, masonry, ceramic materials and/or other materials and are designed to withstand high temperatures and corrosive substances.

In heating systems, flues are commonly found in furnaces, boilers, and water heaters, and they are used to vent combustion gases to the outside. In fireplaces and woodstoves, flues are used to carry smoke and other byproducts of combustion away from the living area. Flues can be vertical or horizontal and can have different shapes and sizes depending on the specific application.

The term "flue gas" as utilized herein can relate to the exhaust gas that is produced during the combustion of fuels such as coal, oil, natural gas, hydrogen, or biomass. A flue gas is an example of an exhaust gas. Flue gas may contain a mixture of gases such as carbon dioxide, carbon monoxide, nitrogen oxides, sulfur dioxide, and water vapor, as well as particulate matter such as ash and soot. Flue gas is typically released into the atmosphere through a chimney or a flue, and it can have a significant impact on air quality and the environment if not properly treated or controlled. Flue gas is commonly monitored and analyzed to ensure compliance with environmental regulations and to optimize the performance of combustion systems.

The embodiments can be implemented to develop low emission burners that can burn hydrogen or high-hydrogen blends and which are used in high dilution environments. Burner emissions performance depends on the environment so it is critical that the burner be emissions tested in the same environment it will be used in. While CO2 corrections can be used when there is a hydrocarbon fuel, water vapor is the only option for correcting high hydrogen or pure hydrogen fuels that generate little to no CO2 in the flue gases. The approach described herein can be implemented to correct measured emissions using humidity measurements that in many instances are less sensitive to measurement uncertainty than the conventional oxygen correction approach.

One approach for correcting as-measured emission concentrations to a reference concentration can involve the use of flue gas oxygen concentrations. The corrected concentration, $C_{d(corrected)}$, for example, can be obtained using Equation 1 below, where the parameter $C_{d(measured)}$ is the as-measured pollutant concentration. In the industrial burner industry, the most common reference value is a 3% stack oxygen concentration, which corresponds to approximately 15% excess air for burners fueled by natural gas.

$$C_{d(corrected)} = C_{d(measured)} \left( \frac{O_{2(ambient)} - O_{2(reference)}}{O_{2(ambient)} - O_{2(measured)}} \right) \quad (1)$$

Referring now to FIG. 1, a graph 10 is illustrated depicting O2 correction data determined by a correction factor to 3% (y-axis) versus measured O2 concentration (y-axis), in accordance with an example embodiment. FIG. 1 also illustrates a graph 12 depicting the percentage change in O2 correction factor as determined by a percentage change in correction factor (y-axis) versus measured O2 concentration (y-axis), in accordance with an example embodiment. FIG. 1 depicts a 3% Correction Factor as a function of measured O2% as shown in graph 10 and the first derivative with respect to O2 as illustrated in graph 12.

The correction formula of Equation 1 is deceptively nonlinear, and the correction factor changes exponentially as the measured stack concentration approaches the ambient concentration. This exponential trend is illustrated in graph 10 of FIG. 1, which shows the correction factor to 3% as a function of measured stack oxygen concentration for an ambient oxygen concentration of 20.95%. Graph 12 of FIG. 1 shows percent change of the correction factor as a function of ambient O2 concentration. Graph 12 demonstrates that at a measured stack concentration of 17.5%, an infinitesimal change in the measured oxygen concentration will cause a greater than 20% variation in the corrected pollutant concentration. In other words, if the true corrected NOx ppm value at 3% is 25 ppm, the corrected analyzer measurement is expected to be anywhere between 20 and 30 ppm when the conventional O2 correction approach is used.

For dilute air streams, SCAQMD (South Coast Air Quality Management District), for example, requires that CO2 be measured in order to compute the emissions correction factor. This method of correction is substantially less sensitive to measurement uncertainty provided the concentration of CO2 in the flue is above the noise floor of the instrument. However, this method cannot be used when there is little to no carbon in the fuel, as is the case in pure hydrogen or high-hydrogen fuel blends. In these instances, the measured humidity may be used to correct the emissions, as in many instances this correction will be less sensitive to experimental uncertainty than the oxygen correction.

The combustion of all hydrogen or hydrocarbon fuels produces water as a byproduct. The amount of water generated per mole of fuel burned will depend on the fuel mixture, but this can be calculated from first principles using the stoichiometric combustion equation. The theoretical amount of water is compared to the measured amount of water and used to determine the amount of dilution that has occurred.

With this in mind, an equilibrium equation can be derived based on several assumptions. First, an assumption can be made that the mixture is lean, so there is no unburned fuel in the flue gases. Second, the equilibrium species can be limited to H2O, CO2 N2, and O2. Third, the mole fraction of water vapor in the combustion air is assumed to be the same as the mole fraction of vapor in the process dilution air. This is true if both the process air and combustion air are drawn from the same source. This additionally implies that water is not added in the process (i.e., by drying a wet material) before the humidity of the pure flue gases are sampled. The equilibrium products for a hydrogen-hydrocarbon blend subject to the previous assumptions is given by Equation 2 below, where f represents the hydrogen blend fraction.

$$(1-f)C_xH_y + fH_2 + a(O_2 + 3.76N_2)\left(1 + \frac{\% \; XS}{100}\right) \rightarrow \quad (2)$$
$$bCO_2 + dH_2O + 3.76aN_2\left(1 + \frac{\% \; XS}{100}\right) + a\left(\frac{\% \; XS}{100}\right)O_2$$

The coefficients can be expressed in terms of the excess air amount and the hydrocarbon content as shown in Equations 3a-3c. The % XS in Equation 3b is the percent excess air. Note that the stoichiometric coefficients only depend on the fuel composition and the blend fraction of hydrogen. The corollary to this observation is that as long as the fuel and hydrogen blend is known, the measurement of one species in the exhaust is sufficient to determine the concentration of the others.

$$b = x(1-f) \quad (3a)$$

$$a = \left(\left(x + \frac{y}{4}\right)(1-f) + \frac{f}{2}\right) \quad (3b)$$

$$d = \frac{y(1-f)}{2} + f \quad (3c)$$

Equation 2 can be used to work out the mole fractions for different species. These stoichiometric ratios can be defined in Equations 4a-4c. In these equations Fh is the number of moles water generated per mole fuel, Fw the total number of moles wet gas generated per mole fuel, and Fd the number of moles dry gas generated per mole fuel at stoichiometric conditions.

$$F_b = d \quad (4a)$$

$$F_w = b + d + 3.76a \quad (4\%)$$

$$F_d = b + 3.76a \quad (4c)$$

Two challenges with using a water vapor correction are (1) the incoming air has an appreciable amount of water that must be subtracted and (2) the corrections must be converted to a dry basis after correction. The most straightforward approach is to measure the amount of water generated by combustion, then use to calculate the amount of oxygen that must be present in the post-combustion gases. Once the oxygen concentration is known, the standard correction formula in Equation 1 can be used to correct the emissions as normal.

Figure 2:
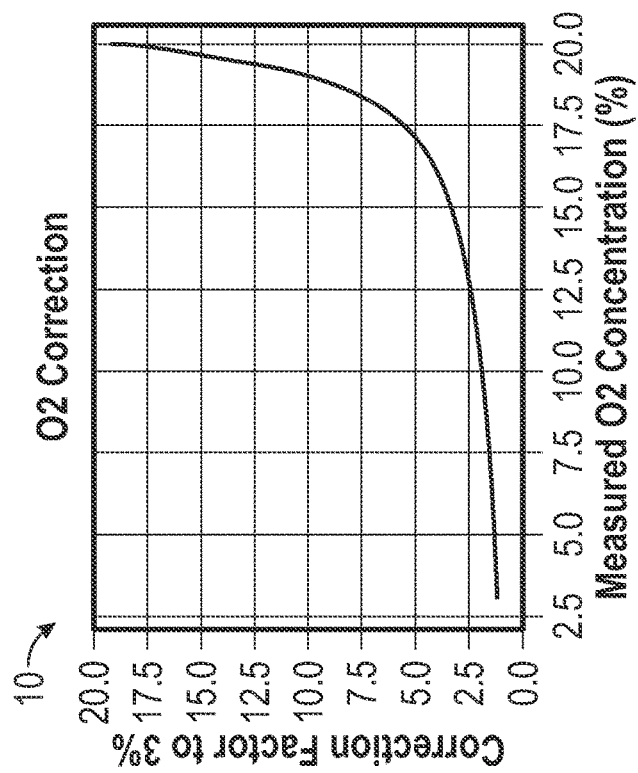
FIG. 2 illustrates a schematic diagram of a system that shows the control volume used to derive the mass flow relationships.
Figure 2:
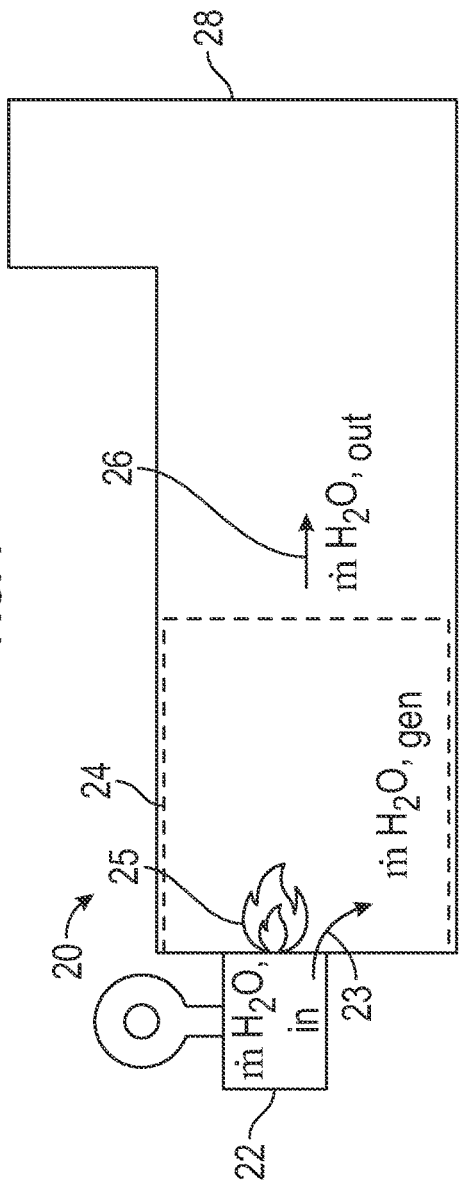

FIG. 2 illustrates a schematic diagram of a system 20 that includes a burner 22 and a control volume 24, in accordance with an embodiment. The control volume 24 is shown in FIG. 2 within a flue 28. A flame 25 with respect to the burner 22 is also shown in FIG. 2.

Consider the control volume 24 shown in FIG. 2. An objective is to calculate the concentration of water vapor in the flue 28 that is generated by combustion. Note that unless otherwise specified, m is the molar flow rate. Assuming steady state, the conservation of species for water in the control volume can be expressed by Equation 5.

$$0 = \dot{m}_{H_2O,in} - \dot{m}_{H_2O,out} + \dot{m}_{H_2O,gen} \tag{5}$$

The water entering the control volume 24 is indicated by arrow 23 in FIG. 2 and can be represented by Equation 6, where $X_{H2O,in}$ is the mole fraction of water in the incoming air stream, $4.76 \cdot a \cdot \dot{m}$ fuel is the amount of stoichiometric air consumed by combustion, and m˙ extra is the amount of air not consumed by combustion (either excess air supplied at the burner or dilution air from the process).

$$\dot{m}_{H_2O,in} = X_{H_2O,in}(4.76 \cdot a \cdot \dot{m}_{fuel} + \dot{m}_{extra}) \tag{6}$$

The water leaving the control volume is indicated by arrow 26 in FIG. 2 and is also expressed by Equation 7, where Fwm˙ Fuel is the number of moles of wet gas generated by the combustion. The combustion process does not change the number of moles oxygen in the extra air, but it does consume all of the oxygen in the stoichiometric combustion air. This change is the reason for considering the mass flow of "extra" air separately from the mass flow of "combustion" air (even though both streams are provided by the same blower or compressor).

$$\dot{m}_{H_2O,out} = (F_w \dot{m}_{Fuel} + \dot{m}_{extra}) X_{H_2O,flue} \tag{7}$$

The water generated in the control volume 24 is from the combustion process and can be expressed in terms of the molar fuel flow rate shown by Equation 8.

$$\dot{m}_{H_2O,generated} = F_h \dot{m}_{Fuel} \tag{8}$$

Combining all equations yields:

$$0 = X_{H_2O,in}(4.76 a \cdot \dot{m}_{Fuel} + \dot{m}_{extra})$$

$$-(F_w \dot{m}_{Fuel} + \dot{m}_{extra}) X_{H_2O,flue} + F_h \cdot \dot{m}_{Fuel} \tag{9}$$

Solving Equation 9 for the unknown m˙ extra yields Equation 10a. This allows the number of moles of water contributed by combustion to be calculated. Equation 10a can be divided by m˙ Fuel to obtain m˙ extra on a per-mole-fuel basis (Equation 10b).

$$\dot{m}_{extra} = \dot{m}_{Fuel} * \frac{F_w X_{H_2O,out} - 4.76 a X_{H_2O,in} - F_h}{X_{H_2O,in} - X_{H_2O,out}} \tag{10a}$$

$$\frac{\dot{m}_{extra}}{\dot{m}_{Fuel}} = \frac{F_w X_{H_2O,out} - 4.76 a X_{H_2O,in} - F_h}{X_{H_2O,in} - X_{H_2O,out}} \tag{10b}$$

Now that m˙ extra is known, it can be used to calculate the mole fraction of water in the products due to combustion from Equation 11.

$$X_{H_2O,combustion} = \frac{F_h}{F_w + \dot{m}_{extra}} \tag{11}$$

The final step is to use the mole fraction of water from combustion to calculate the mole fraction of oxygen in the products on a dry basis using equations 12a-12b, then calculate the oxygen correction using Equation 1 after converting the mole fraction to a percent.

$$x = \frac{\frac{d}{X_{H_2O,combustion}} - b - d - 3.76a}{3.76a + a} \tag{12a}$$

$$X_{O_2,Dry} = \frac{ax}{b + 3.76a + 3.76ax + ax} \tag{12b}$$

If the mole fraction of water can be measured directly in ppm or percent, the preceding equations are sufficient to correct emissions based on the measured water content in the flue gases for an arbitrary hydrogen-hydrocarbon blend. However, it is more likely that the relative humidity will be measured rather than the water vapor volume concentration. The relative humidity, (RH), can be defined as the ratio of the partial pressure of water vapor, $P_{H2O}$ to the saturation pressure of water vapor at the gas stream temperature, $P_{sat}(T)$, as shown in Equation 13a. The value of $P_{sat}(T)$ can be found using either a psychrometric chart or a thermodynamic property database.

By Dalton's law of partial pressures, the partial pressure of the water vapor, given by Equation 13b, is proportional to the mole fraction of water vapor in the air measured air stream. We can therefore use Equation 13c to calculate the mole fraction of water vapor using measurements of the relative humidity and the atmospheric pressure and looking up the saturation pressure of water vapor at the given temperature from a steam table.

$$RH = \frac{P_{H_2O}}{P_{sat}(T)} \tag{13a}$$

$$P_{partial,H_2O} = RH * P_{sat}(T) \tag{13b}$$

$$X_{H_2O} = \frac{RH * P_{sat}(T)}{P_{ambient}} \tag{13c}$$

Finally, the percent of excess air can be calculated using Equation 14b. It is important to note the excess air is calculated at the measurement location and cannot distinguish between excess air supplied by the burner blower and dilution air supplied by the process. Therefore, the humidity measurement should be taken as closely to the burner exhaust as practical in order to minimize the effect of dilution air if the burner excess air is to be known with reasonable accuracy.

$$\% XS = \frac{\dot{m}_{extra}}{4.76 * a * \dot{m}_{Fuel}} \tag{14a}$$

$$\% XS = \frac{F_w X_{H_2O,out} - 4.76 a X_{H_2O,in} - F_h}{4.76 a (X_{H_2O,in} - X_{H_2O,out})} \tag{14b}$$

Figure 3:
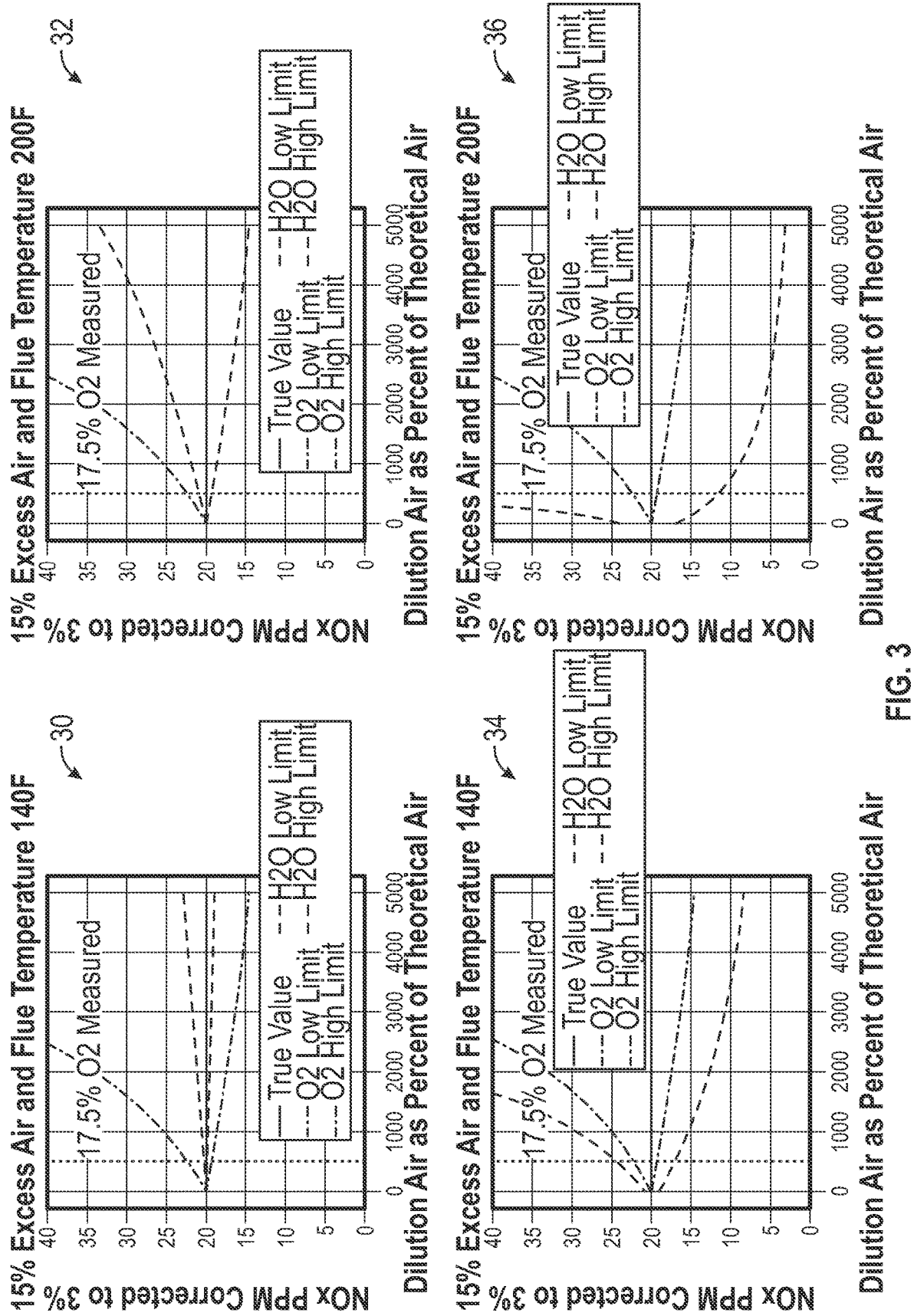
FIG. 3 illustrates graphs depicting data indicative of simulated examples of water vapor correction uncertainties, in accordance with an embodiment.

FIG. 3 demonstrates the effects of measurement uncertainty and fuel composition as a function of dilution on the emissions correction using measured O2 and water vapor. In FIG. 3, four example graphs 30, 32, 34, and 36 are shown depicting data indicative of excess air and flue temperatures. For example, graph 30 illustrates data tracking 15% excess air and a flue temperature of 140 F. Graph 32 depicts data tracking 15% excess air and a flue temperature of 200 F. Graph 34 shows data indicative of 15% excess air and flue temperature 140F. Graph 36 tracks data indicative of 15% excess air a flue temperature of 200 F.

Both simulated cases have an excess air of 15% and a true NOx value of 20 ppm. In both cases the ambient temperature is assumed 80 F and 70% RH, which is representative of summer conditions and is a worst case scenario. Colder, drier conditions can decrease the uncertainty of humidity correction because the change in measured humidity will be greater between the blower air and the flue gases.

The uncertainty in the O2 measurement was assumed to be ±0.1% of full scale or ±0.0025 for the analyzer with range of 0-25% O2. This uncertainty is representative of the accuracy for industrial paramagnetic O2 sensors. The uncertainty in the relative humidity measurement was tested at ±3% and ±0.2%, which is representative of the expected accuracy for wet bulb temperature and chilled mirror hygrometers, respectively. In each figure the solid line shows the true NOx value. The dotted lines show the expected upper and lower limits of corrected NOx based on the uncertainty of the O2 analyzer. Other dotted lines show the same uncertainty limits for the humidity correction at the given instrument uncertainty.

The dilution percentage can be expressed relative to the amount of air flowing through the burner. The 5000% percent dilution was chosen at the upper end (see y-axis and the right of the graphs(s)) in order to approximate air heat applications. The flue temperature can be assumed constant for simplicity in all four simulations (in reality the flue temperature will decrease with increasing dilution ratio).

The first simulated examples depicted in FIG. 3 assumes 15% excess air with a constant ambient temperature of 80 F and relative humidity of 70% for pure methane. The first two simulations (graphs 30 and 32) assume the RH measurement uncertainty is ±0.2% in the flue, while the other two simulations (graphs 34 and 36) an RH uncertainty of ±3%. These uncertainties are representative for solid-state and wet-bulb humidity probes, respectively. At no dilution, the relative humidity of the flue is 96% at 140 F and 24% at 200 F. If the flue RH exceeds 100% this correction technique is no longer accurate, as that means that water vapor has begun to condense.

The graphs shown in FIG. 3 thus demonstrate the correction factor uncertainty increases with increasing amounts of dilution air, as expected. More dilution air means the change in O2 or humidity between inlet and outlet decreases, and this decreased delta causes a smaller range of full scale to be utilized for each correction method. The graphs shown in FIG. 3 also indicate that the humidity correction method is less sensitive to measurement uncertainty than the oxygen correction as long as the humidity sensor has an uncertainty of ±0.2% or less. This is indicated by the reduced distance between the upper and lower correction limits for the humidity correction compared to the O2 correction. However, when the humidity uncertainty is ±3%, as is typical of web-bulb hygrometers, the humidity correction is worse than the oxygen correction method. This means that a practical humidity correction system must use a solid-state or chilled mirror hygrometer sensor, as these are the only sensors that have the required precision.

The second simulated example assumes a 50% H2 blend. The lower temperature was increased to 145 F to ensure the flue RH was below 100%. The solid line shows the true corrected NOx value. The dotted lines show the high and low limits for O2 correction given the instrument uncertainty, while the other dotted lines show the same for humidity corrections at the given uncertainty level.

Figure 5:
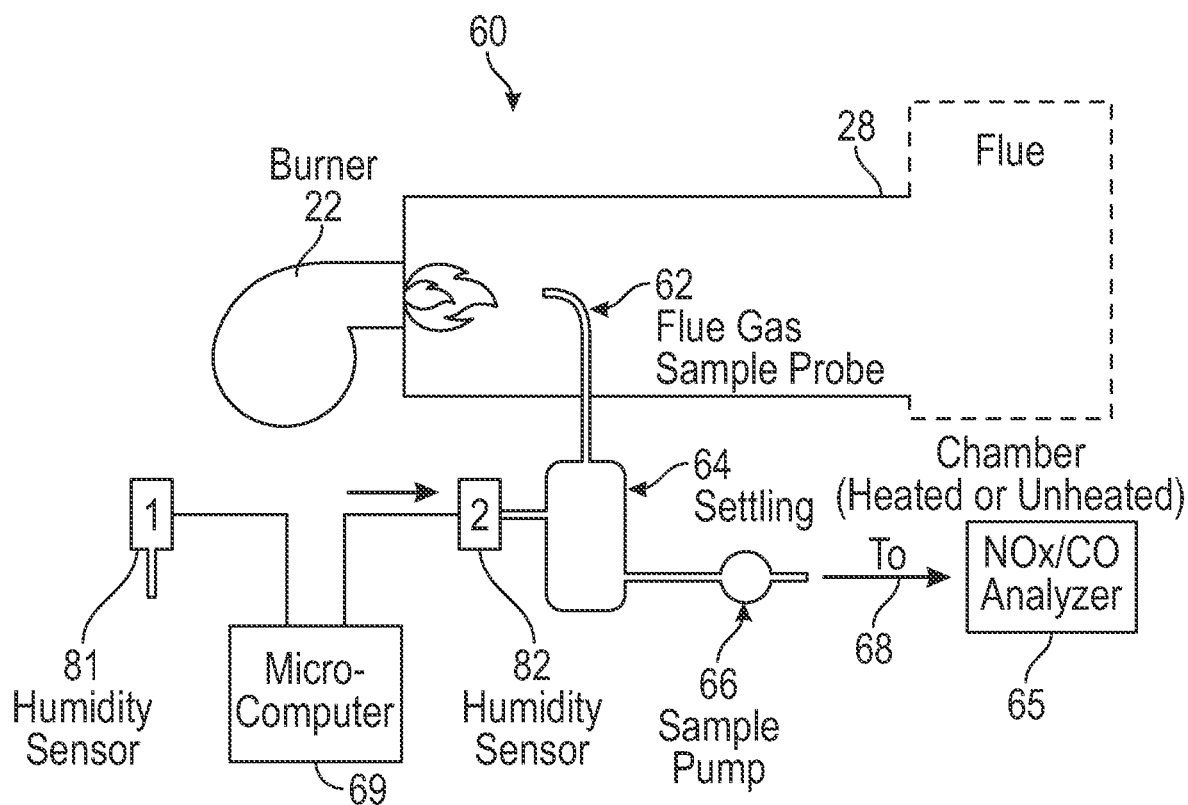
FIG. 5 illustrates a schematic diagram of a device for correcting stack emissions based on humidity measurements in pre- and post-combustion gases, in accordance with an embodiment.

FIG. 5 illustrates an image 50 of a lab test fixture including a settling chamber, in accordance with an embodiment. The measurement technique discussed above was validated using the lab scale test fixture pictured in image 50 of FIG. 5. The flame was provided by a propane torch and a small ventilation fan was used to provide the dilution process air. Relative humidity was measured using a Roscid Technologies HDR200 Humidity and dew point transmitter. These sensors have a maximum operating temperature of 392 F (200 C) and a reported dew point uncertainty of ±1.8 F(±1 C). Ambient humidity was measured in the quiescent air outside of the test fixture, and the burned humidity was measured in the sealed, white HDPE settling chamber outside of the test fixture.

CO2 was measured using a Thermo Fisher 410i analyzer and used to determine the "true" emissions correction factor. The sample pump on the CO2 analyzer was used to draw the sample into the settling chamber and ensured that both the humidity probe and the analyzer was measuring the same flue gas stream. The amount of process air dilution was changed by changing the firing rate of the propane torch, as the airflow was fixed.

Results are summarized in Table 1, which is shown below. Each number in the "Fire Rate" column corresponds to a different torch setting. Multiple measurements were taken at each firing rate once the CO2 analyzer readings stabilized.

TABLE 1

Test Data

| Fire Rate | CO2 (ppm) | Inlet RH | Inlet Temp | Outlet RH | Outlet Temp | CO2 CF | H2O CF | Error (%) |
|---|---|---|---|---|---|---|---|---|
| 1 | 5300 | 37.7 | 75 | 53 | 77.7 | 26.2 | 22.2 | 17.8 |
| 1 | 5300 | 37.8 | 74.6 | 46.2 | 82.2 | 25 | 22.3 | 12.1 |
| 1 | 5200 | 38.5 | 74.3 | 40.2 | 86.6 | 25.2 | 22.7 | 11.0 |
| 1 | 5330 | 38.7 | 74.1 | 38.3 | 88.6 | 24.1 | 22.3 | 8.07 |
| 1 | 5070 | 38.8 | 74 | 36.5 | 90 | 24.4 | 23.3 | 4.72 |
| 1 | 5090 | 39.3 | 73.9 | 35.1 | 91.2 | 24.9 | 23.1 | 7.79 |
| 1 | 5050 | 39.9 | 73.6 | 33.7 | 92.8 | 24.4 | 23.3 | 4.7 |
| 2 | 3720 | 40.1 | 73.5 | 30.2 | 93.8 | 31.1 | 31.7 | 1.89 |
| 2 | 3710 | 40.4 | 73.3 | 30.3 | 93.7 | 30.6 | 31.8 | 3.77 |
| 2 | 3730 | 40.4 | 73.3 | 30.6 | 93.5 | 30.3 | 31.6 | 4.11 |
| 3 | 11670 | 40.9 | 73.2 | 43 | 96 | 11.5 | 10.1 | 13.9 |
| 3 | 11530 | 40.9 | 73.1 | 39 | 99.3 | 11.5 | 10.2 | 12.75 |
| 3 | 11430 | 40.9 | 73.0 | 33.9 | 104.4 | 11.2 | 10.3 | 8.74 |
| 3 | 11320 | 41.2 | 73.0 | 31.1 | 107.7 | 11 | 10.4 | 5.77 |
| 3 | 11290 | 41.5 | 73.0 | 29.5 | 109.5 | 11.1 | 10.5 | 5.71 |
| 3 | 11080 | 41.5 | 72.9 | 28.0 | 111.5 | 11.0 | 10.7 | 2.80 |
| 4 | 10910 | 41.5 | 73.0 | 26.4 | 113 | 11.3 | 10.8 | 4.63 |
| 4 | 10920 | 41.5 | 72.9 | 25.6 | 114 | 11.3 | 10.8 | 4.63 |

It should be appreciated that reference to the specific parameters and numbers herein, along with reference to particular devices such as the aforementioned Roscid Technologies HDR200 Humidity and dew point transmitter, Thermo Fisher 410i analyzer, and so on, are provided herein for illustrative and exemplary purposes only and are not considered limiting features of the embodiments. Other types of devices and systems may be implemented in accordance with the embodiments.

In general, the humidity measurement method took longer to stabilize than the CO2 analyzer measurement. This is indicated by the generally decreasing error of the humidity correction factor relative to the CO2 correction factor at a given firing rate. The response time of the humidity probe is likely limited by the response time of the temperature probe, which is substantially longer than the response time of the optical method used in the CO2 analyzer. However, once the temperature stabilized the difference between correction methods was less than 5%.

Figure 4:
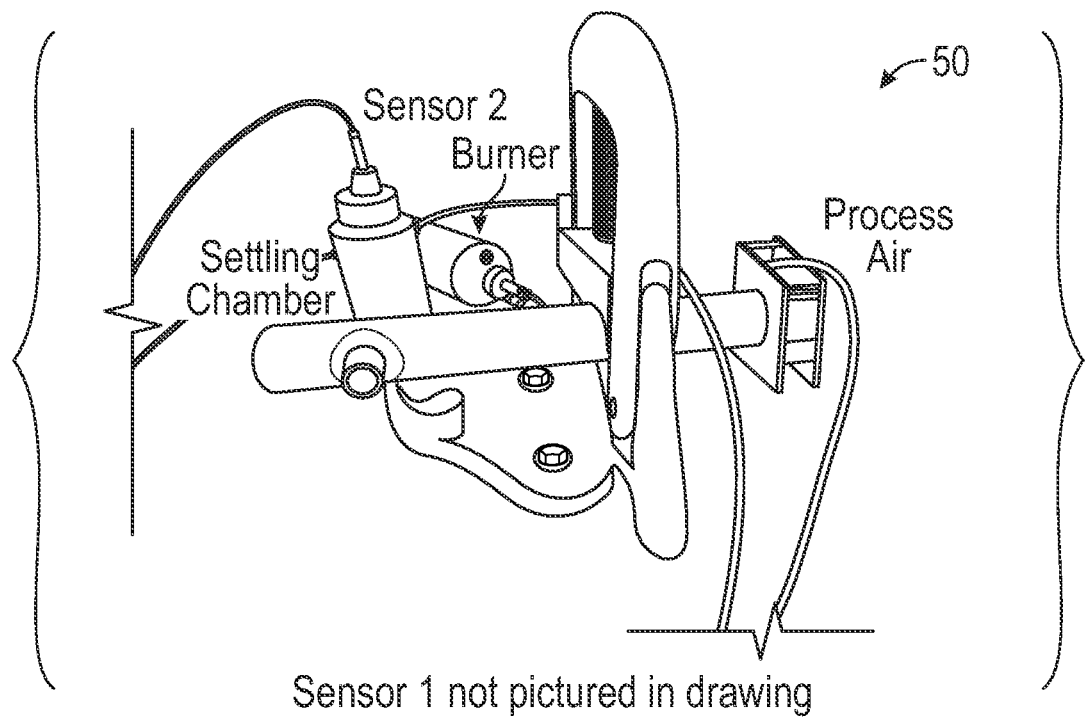
FIG. 4 illustrates an image of a lab test prototype including a settling chamber, in accordance with an embodiment.

The simulation results depicted in the various graphs in FIG. 3 and FIG. 4 demonstrate that an uncertainty in the relative humidity of ±3% is worse than using the measured O2 concentration to correct emissions. This means that wet bulb humidity measurements are too imprecise to be an effective way to calculate the emissions correction factor.

Additionally, the uncertainty in the water vapor correction can decrease with increasing relative humidity in the flue gases, albeit non-linearly. This is indicated by the fact the uncertainty is lower at lower temperatures for a given uncertainty in the RH measurement. The implication of this is that the accuracy of the system/device can be improved by cooling the flue gases before they are sampled, the caveat being that the cooling must not cause any condensation. Moving the probe farther downstream may accomplish the same result provided that significant amounts of dilution air do not enter the system. The simulations demonstrate the water vapor correction can have less uncertainty than the O2 concentration measurements in dilute air streams provided the relative humidity is measured with sufficient accuracy.

The lab test results, summarized in Table 1 indicate the humidity correction method can achieve similar accuracy to the CO2 correction method with the caveat that the humidity correction method takes longer to stabilize. Taken together with the simulation results, the lab results in Table 1 indicate that correcting measured emissions on the basis of humidity is a viable option, especially for high hydrogen or pure hydrogen fuels.

Equation 4c shows that Fd decreases as the fraction of hydrogen in the fuel increases. This means that corrected emissions concentrations based on volume are only comparable at a given hydrogen blend. For example, consider two burners that generate 1 mole of NOx per fuel burned. The first burner runs on pure methane while the second burner runs on 50% blend of methane and hydrogen. The dry corrected NOx for the second burner will be higher than the first simply because the total amount of dry gas decreased. In other words, high hydrogen blends are "penalized" by having a higher corrected emission concentration. This penalization disappears when the emissions are considered on a volume fuel flow or thermal energy basis.

FIG. 5 illustrates a schematic diagram of a device 60 for correcting emissions, in accordance with an embodiment. The device 60 can correct stack emissions based on humidity measurements in pre- and post-combustion gases. The device 60 shown in FIG. 6 includes a burner 22 and a flue gas sample probe 62 that extends into a flue 28. The flue gas sample probe 62 extends from a settling chamber 64 into the flue 28. The settling chamber 64 may be heated or unheated. A sample pump 66 extends from the setting chamber 64. Note that the arrow 68 shown in FIG. 5 indicates that an output from the sample pump 66 can be provided as input to an NOx/CO analyzer 65.

The flue gas sample probe 62 can be implemented as a device that can extract a representative sample of flue gas from a combustion system for analysis. Such a combustion system can incorporate the device 60. The flue gas sample probe 62 can include a metal tube or pipe with a pointed end that can be inserted into the flue 28. The flue gas sample probe 62 can be connected to a sample line or tubing, which can carry the extracted gas to a sampling system for analysis by, for example, the NOx/CO analyzer 65.

The tip of the flue gas sample probe 62 can be inserted deep enough into the flue 28 to capture a representative sample of the flue gas composition. Some flue gas sample probes may have a built-in filter or screen to remove particulate matter from the sample before it enters the sample line.

The flue gas sample probe 62 may be heated to prevent the condensation of moisture or other components of the flue gas, which can interfere with the accuracy of the analysis. In some embodiments, the flue gas sample probe 62 may be equipped with a thermocouple or other temperature sensor to measure the temperature of the flue gas at the sampling point.

Flue gas sample probes come in different sizes and configurations to fit different flue sizes and shapes. They are commonly used for emissions monitoring and control, combustion efficiency testing, and other applications where accurate measurements of flue gas composition may be required.

A group of sensors including a first sensor 81 and a second sensor 82 can communicate electronically (wired or wirelessly) with a microcomputer 69. Note that although two sensors 81 and 82 are shown in FIG. 5, it can be appreciated that additional sensors may be implemented with the configuration shown in FIG. 5 in other embodiments. Each of the sensors 81 and 82 may be sensors such as, for example, one or more of a relative humidity sensor, a dew point sensor, a trace water vapor sensor, and/or other types of sensors.

The humidity of the air entering the blower can be measured using the first sensor 81. Note that the blower is a part of the burner 22. The sample pump 66 can draw a flue gas sample from the process air stream via the sampling probe. This flue gas sample enters the settling chamber where the humidity of the flue gas sample is measured by the sensor 82. The settling chamber 64 may or may not be heated, but care must be taken so the water in the flue gases does not condense in the sampling line or the settling chamber 64.

The microcomputer 69 can calculate the mass of water vapor in each sample, then using the stoichiometry of the fuel determines the dilution factor. The relevant equations and their derivations for this calculation were discussed previously herein. The microcomputer 69 can be implemented as a computing device that includes one or microprocessors in the context of integrated circuits containing a processing unit, memory, and input/output interfaces of a computer on a single chip or a group of chips. In some embodiments, the microcomputer 69 may be implemented as a microcontroller, which is a specialized microcomputer designed for embedded systems and control applications. Such a Microcontroller may include a small amount of memory and can be optimized for low power consumption and real-time control tasks. The microcomputer 69 may be of a type small computing devices used in industrial control operating systems and field devices.

Figure 6:
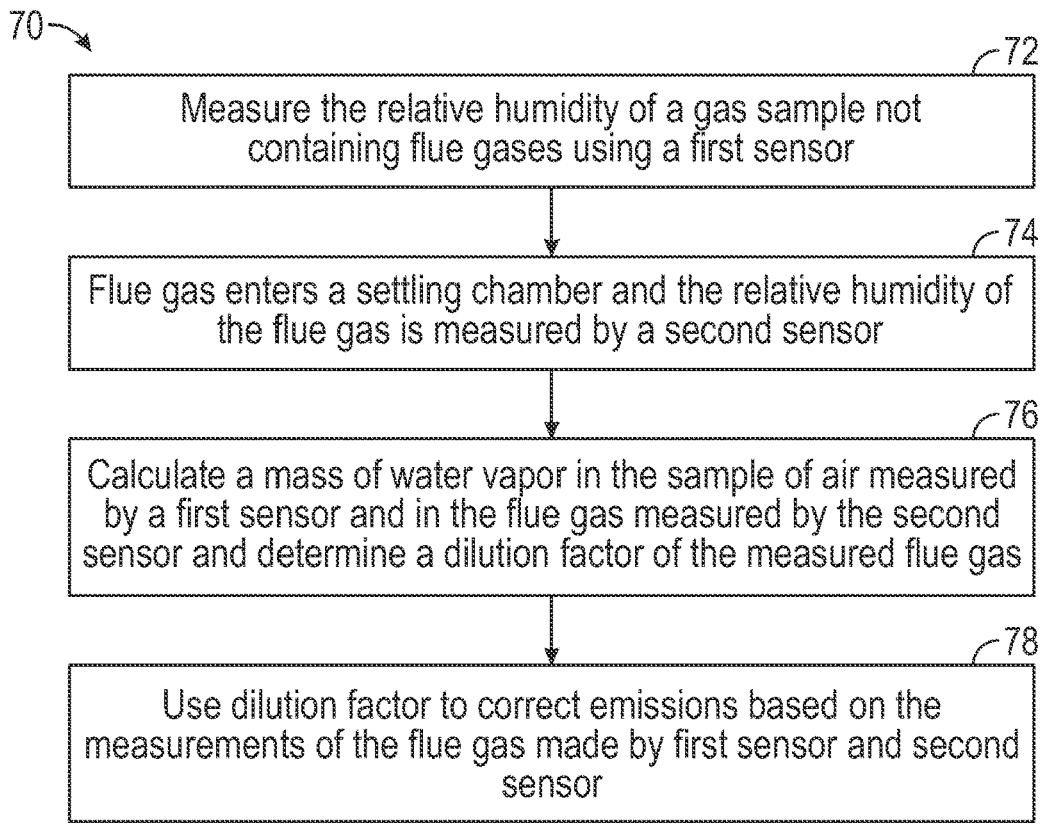
FIG. 6 illustrates a flow chart of operations depicting logical operations steps of a method of operating the device for correcting emissions, in accordance with an embodiment.

FIG. 6 illustrates a flow chart of operations depicting logical operations steps of a method 70 of operating the device 60 for correcting emissions, in accordance with an embodiment. The method 70 can include a number of steps, operations or instructions as depicted in the blocks shown in FIG. 6. As indicated at block 72, a step or operation can be implemented to measure using a first sensor, the relative humidity of a gas sample not containing flue gases. Thereafter, as shown at block 74, a step or operation can be implemented to measure the relative humidity of the flue gas with a second sensor. Note that the flue gas enters the settling chamber 64 and the relative humidity of the flue gas is measured by the second sensor.

Next, a step or operation can be implemented as shown at block 76 to calculate a mass of water vapor in the sample of air measured by a first sensor and in the flue gas measured by the second sensor and determine a dilution factor of the measured flue gas. Note that the dilution factor may be determined using stoichiometry of the flue gas. Thereafter, as shown at block 78, a step or operation can be implemented in which the dilution factor is used for correcting emissions based on the measurements of the flue gas made by the first sensor and the second sensor.

Figure 7:
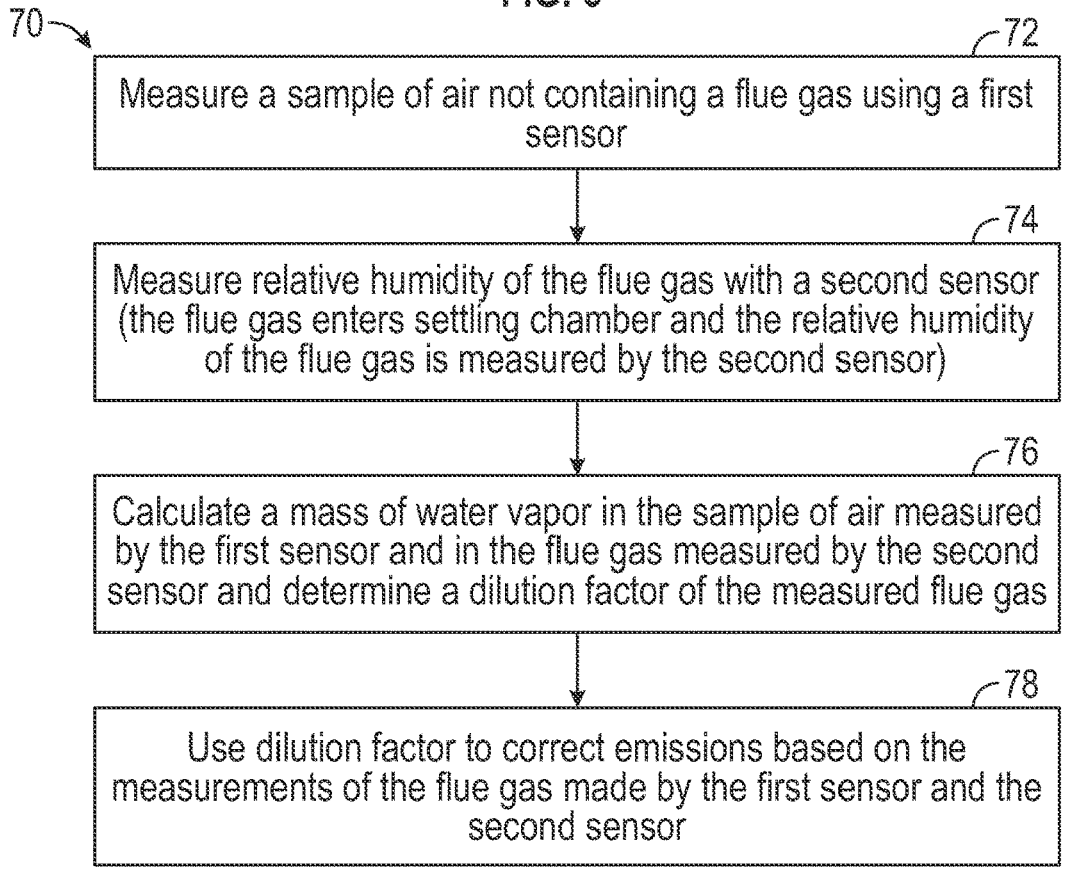
FIG. 7 illustrates a flow chart of operations depicting logical operations steps of a method of operating the device for correcting emissions including cooling of a flue gas to increase the relative humidity of the flue gas, in accordance with an embodiment.

FIG. 7 illustrates a flow chart of operations depicting logical operations steps of a method 71 of operating the device for correcting emissions including cooling of a flue gas to increase the relative humidity of the flue gas, in accordance with an embodiment. Note that the method 71 shown in FIG. 7 is similar to the method 70 depicted in FIG. 6, albeit with additional operational steps. As shown at block 72, a step or operation can be implemented to measure a sample of air not containing a flue gas using the first sensor. Then, as depicted at block 73, a step or operation can involve cooling of the flue gas in order increase the relative humidity of the flue gas prior to measuring the relative humidity of the flue gas measured by the second sensor.

Thereafter, as shown at block 74, a step or operation can be implemented to measure the relative humidity of the flue gas with the second sensor, wherein the flue gas enters a settling chamber and the relative humidity of the flue gas is measured by the second sensor. Next, as depicted at block 76, a step or operation can be implemented to calculate the mass of water vapor in the sample of air measured by the first sensor and in the flue gas measured by the second sensor and determine a dilution factor of the measured flue gas. Then, as shown at block 78, a step or operation can be implemented to use the dilution factor to correct emissions based on the measurements of the flue gas made by the first sensor and the second sensor.

This disclosure has demonstrated methods, devices and systems, which can be implemented in the context of varying embodiments to correct measured pollutant concentrations from the combustion of low or zero carbon fuels that is less uncertain than using the measured O2 concentration. However, it should be noted care must be taken such that the assumptions used to derive this technique are not violated. Some embodiments may be more sensitive to the flue conditions than conventional CO2 or O2 measurements.

Based on the foregoing, it can be appreciated that a number of different embodiments are disclosed herein, For example, in one embodiment, a device for correcting emissions, can include a first sensor that measures a sample of air not containing an exhaust gas; a second sensor that measures a relative humidity of the exhaust gas; and a microcomputer that calculates a mass of water vapor in the sample of air measured by the first sensor and in the exhaust gas measured by the second sensor and determines a dilution factor of the measured exhaust gas, the dilution factor used for correcting emissions based on the measurements of the exhaust gas made by the first sensor and the second sensor.

In an embodiment, the exhaust gas can enter the settling chamber where the relative humidity of the exhaust gas can be measured by the second sensor.

In an embodiment, the exhaust gas can be cooled to increase the relative humidity of the exhaust gas prior to measuring the relative humidity of the exhaust gas measured by the second sensor.

In an embodiment, the first sensor can measure the air entering a blower.

In an embodiment, a sampling probe and a sample pump can be provided, wherein the sample pump can draw a sample of the exhaust gas from a process air stream via the sampling probe.

In an embodiment, the first sensor can comprise one or more of: a relative humidity sensor, a dew point sensor, a trace water vapor sensor, etc.

In an embodiment, the second sensor can comprise one or more of: a relative humidity sensor, a dew point sensor, a trace water vapor sensor, etc.

In an embodiment, the dilution factor can be determined by the microcomputer using the stoichiometry of the exhaust gas.

In an embodiment, a device for correcting emissions, can include, for example, a plurality of sensors, wherein at least one sensor measures a sample of air not containing an exhaust gas, and at least one other sensor measures a relative humidity of the exhaust gas; and a microcomputer that calculates a mass of water vapor in the sample of air measured by the at least one sensor and in the exhaust gas measured by the at least one other sensor and determines a dilution factor of the measured exhaust gas, the dilution factor used for correcting emissions based on the measurements of the exhaust gas made by the plurality of sensors.

In an embodiment, a method of operating a device for correcting emissions, can involve: measuring with a first sensor, a sample of air not containing an exhaust gas; measuring a relative humidity of the exhaust gas with the second sensor, wherein the exhaust gas enters a settling chamber and the relative humidity of the exhaust gas is measured by the second sensor; and calculating a mass of water vapor in the sample of air measured by the first sensor and in the exhaust gas measured by the second sensor and determines a dilution factor of the measured exhaust gas, the dilution factor used for correcting emissions based on the measurements of the exhaust gas made by the first sensor and the second sensor.

An embodiment of the method can further involve cooling the exhaust gas to increase the relative humidity of the exhaust gas prior to measuring the relative humidity of the exhaust gas measured by the second sensor.

An embodiment of the method may also involve measuring with the first sensor, the air entering a blower.

An embodiment of the method may further involve providing a sampling probe and a sample pump, wherein the sample pump draws a sample of the exhaust gas from a process air stream via the sampling probe.

An embodiment of the method also can involve determining the dilution factor using stoichiometry of the exhaust gas.

The methods, systems and devices are described in this detailed description and illustrated in the accompanying drawings by various blocks, modules, components, circuits, steps, processes, algorithms, etc. (which may be collectively referred to as "elements"). These elements may be implemented using electronic hardware, computer software, or any combination thereof. Whether such elements are implemented as hardware or software depends upon the particular application and design constraints imposed on the overall system or device.

Although the operations of the method(s) and elements of the circuit(s) and system(s) herein are shown and described in a particular order or configuration, the order of the operations and elements of the methods, devices, circuits and systems may be altered so that certain operations, steps or elements may be performed in an inverse or different order or arrangement or so that certain operations may be performed, at least in part, concurrently with other operations. In another embodiment, instructions, steps, operations or sub-operations of distinct operations or elements may be implemented in an intermittent and/or alternating manner.

Alternatively, embodiments and elements thereof may be implemented in hardware or in an implementation containing hardware and software elements. In embodiments that utilize software, the software may include but is not limited to firmware, resident software, microcode, etc.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A device for correcting emissions, comprising:
   a first sensor that measures a sample of air not containing an exhaust gas;
   a second sensor that measures a relative humidity of the exhaust gas; and
   a microcomputer that calculates a mass of water vapor in the sample of air measured by the first sensor and in the exhaust gas measured by the second sensor and determines a dilution factor of the measured exhaust gas, the dilution factor used for correcting emissions based on the measurements of the exhaust gas made by the first sensor and the second sensor, wherein the exhaust gas is cooled to increase the relative humidity of the exhaust gas prior to measuring the relative humidity of the exhaust gas measured by the second sensor.

2. The device of claim 1 wherein the exhaust gas enters a settling chamber where the relative humidity of the exhaust gas is measured by the second sensor.

3. The device of claim 1 wherein the first sensor measures the air entering a blower.

4. The device of claim 1 further comprising a sampling probe and a sample pump, wherein the sample pump draws a sample of the exhaust gas from a process air stream via the sampling probe.

5. The device of claim 1 wherein the first sensor comprises at least one of: a relative humidity sensor, a dew point sensor, and/or a trace water vapor sensor.

6. The device of claim 1 wherein the second sensor comprises at least one of: a relative humidity sensor, a dew point sensor, and/or a trace water vapor sensor.

7. The device of claim 1 wherein the dilution factor is determined by the microcomputer using a stoichiometry of the exhaust gas.

8. The device of claim 1 wherein the first and second sensors comprise at least one of: a relative humidity sensor, a dew point sensor, and/or a trace water vapor sensor.

9. A device for correcting emissions, comprising:
   a plurality of sensors, wherein at least one sensor measures a sample of air not containing an exhaust gas, and at least one other sensor measures a relative humidity of the exhaust gas; and
   a microcomputer that calculates a mass of water vapor in the sample of air measured by the at least one sensor and in the exhaust gas measured by the at least one other sensor and determines a dilution factor of the measured exhaust gas, the dilution factor used for correcting emissions based on the measurements of the exhaust gas made by the plurality of sensors, wherein the exhaust gas is cooled to increase the relative humidity of the exhaust gas prior to measuring the relative humidity of the exhaust gas measured by the at least one other sensor.

10. The device of claim 9 wherein the first sensor measures the air entering a blower.

11. The device of claim 9 further comprising a sampling probe and a sample pump, wherein the sample pump draws a sample of the exhaust gas from a process air stream via the sampling probe.

12. The device of claim 9 wherein the dilution factor is determined by the microcomputer using a stoichiometry of the exhaust gas.

13. A method of operating a device for correcting emissions, the method comprising:
    measuring with a first sensor, a sample of air not containing an exhaust gas;
    measuring a relative humidity of the exhaust gas with a second sensor, wherein the exhaust gas enters a settling chamber and the relative humidity of the exhaust gas is measured by the second sensor;
    calculating a mass of water vapor in the sample of air measured by the first sensor and in the exhaust gas measured by the second sensor and determines a dilution factor of the measured exhaust gas, the dilution factor used for correcting emissions based on the measurements of the exhaust gas made by the first sensor and the second sensor; and
    cooling the exhaust gas to increase the relative humidity of the exhaust gas prior to measuring the relative humidity of the exhaust gas measured by the second sensor.

14. The method of claim 13 further comprising measuring with the first sensor, the air entering a blower.

15. The method of claim 13 further comprising:
    providing a sampling probe and a sample pump, wherein the sample pump draws a sample of the exhaust gas from a process air stream via the sampling probe.

16. The method of claim 13 wherein each of the first and second sensors comprises at least one of: a relative humidity sensor, a dew point sensor, and/or a trace water vapor sensor.

17. The method of claim 13 further comprising determining the dilution factor using a stoichiometry of the exhaust gas.

* * * * *